United States Patent [19]

Brodie

[11] 3,971,309

[45] July 27, 1976

[54] LOG BUNDLING APPARATUS AND METHOD OF BUNDLING LOGS

[76] Inventor: Wilfred Spry Brodie, P.O. Box 175, Gibsons, British Columbia V0N 1V0, Canada

[22] Filed: Apr. 10, 1975

[21] Appl. No.: 566,904

[52] U.S. Cl. .................................... 100/2; 100/16; 214/12; 214/130 R; 214/152
[51] Int. Cl.² ........................................ B63B 27/16
[58] Field of Search ............... 214/12, 13, 14, 15 R, 214/152, 1 R, 92, 130 R, 6 D, 6 S; 212/3 R, 3 A; 56/8, 9; 100/2

[56] References Cited
UNITED STATES PATENTS

| 3,556,319 | 1/1971 | Holden | 214/12 |
| 3,757,678 | 9/1973 | Hemmingsen et al. | 214/12 X |

FOREIGN PATENTS OR APPLICATIONS

| 24,411 | 2/1951 | Finland | 214/13 |
| 28,484 | 12/1956 | Finland | 100/2 |
| 1,511,826 | 11/1969 | Germany | 214/6 H |
| 222,942 | 10/1968 | U.S.S.R. | 214/6 D |
| 283,896 | 12/1970 | U.S.S.R. | 214/15 R |

Primary Examiner—Frank E. Werner

[57] ABSTRACT

A method and apparatus for the bundling of both floating and submerged logs. The log bundling apparatus comprises at least one L-shaped frame, each frame including at least one leg portion and at least one base portion extending outwardly from and rigidly connected to the leg portion, each leg portion adapted to be secured to a support structure situated within a body of water, whereby each base portion and a lower section of each leg portion is adapted to be submerged beneath a surface of the body of water. An arm structure is pivotally secured to each base portion adjacent a free end thereof. Actuating means are mounted between each L-shaped frame and each pivotable arm structure, the actuating means adapted to pivot its respective arm structure from an open position in which the arm structure is submerged beneath the surface of the water to a closed position wherein a free end of each arm structure extends above the surface of the water. As each arm structure is moved from its open position to its closed position, each arm structure is adapted to engage logs situated above each submerged arm structure and its respective submerged base portion so as to urge the logs towards its respective leg portion, thereby forming a compact bundle of logs which can be secured together.

12 Claims, 4 Drawing Figures

LOG BUNDLING APPARATUS AND METHOD OF BUNDLING LOGS

BACKGROUND OF THE INVENTION

1. Field of the Invention

This invention relates generally to an apparatus and method for the bundling of logs, and, more particularly, to such an apparatus and method which can be utilized for gathering and bundling floating and submerged logs with or without the assistance of auxiliary cranes or boats.

2. Description of the Prior Art

The purpose of bundling logs in water is to facilitate further handling thereof in that the logs forming the bundle are substantially aligned with respect to each other and are secured together in a relatively confined space. As well, the bundling of logs limits the loss of submerged logs by bundling the submerged logs to a group of logs having greater buoyancy, thereby minimizing the loss of otherwise usable timber due to the sinking of logs.

While it is known to utilize curved arms which are adapted to be submerged below water level in order to lift submerged or floating articles out of water, most such structures are designed to provide only a lifting function for removing such articles from the water. The apparatus according to the present invention remains substantially submerged during use and is not utilized for removing logs from the water. Rather, the present invention proposes to bundle groups of floating and submerged logs in a simple and economical manner without having to remove the logs from the water and without the necessity of utilizing complicated and expensive equipment.

SUMMARY OF THE INVENTION

According to the present invention, the bundling apparatus comprises at least one L-shaped frame, each frame including at least one leg portion and at least one base portion extending outwardly from and rigidly connected to the leg portion, each leg portion adapted to be secured to a support structure situated within a body of water, whereby each base portion and a lower section of each leg portion is adapted to be submerged beneath a surface of the body of water. An arm structure is pivotally secured to each base portion adjacent a free end thereof. Actuating means are mounted between each L-shaped frame and each pivotable arm structure, the actuating means adapted to pivot its respective arm structure from an open position in which the arm structure is submerged beneath the surface of the water to a closed position wherein a free end of each arm structure extends above the surface of the water. As each arm structure is moved from its open position to its closed position, each arm structure is adapted to engage logs situated above each submerged arm structure and its respective submerged base portion so as to urge the logs towards its respective leg portion, thereby forming a compact bundle of logs which can be secured together.

A method of bundling logs according to the present invention comprises the steps of operating an actuating means to lower a pivotable arm structure of a log bundling apparatus into an open submerged position. A plurality of logs are guided into position above a submerged base portion and the submerged pivotable arm structure of the log bundling apparatus. The pivotable arm structure is then operated by the actuating means from its submerged open position to a closed position wherein a free end thereof extends above the surface of the water and forms the logs above the submerged base portion and arm structure into a compact bundle of logs. Strapping is then secured about the bundle of logs in order to retain the logs together in the bundle. The actuating means is then operated to lower the arm structure from its closed position to its submerged open position and the bundled logs are then floated away from the log bundling apparatus.

BRIEF DESCRIPTION OF THE DRAWINGS

In drawings which illustrate one embodiment of the invention according to the subject application.

DESCRIPTION OF THE PREFERRED EMBODIMENTS

Figure 2:
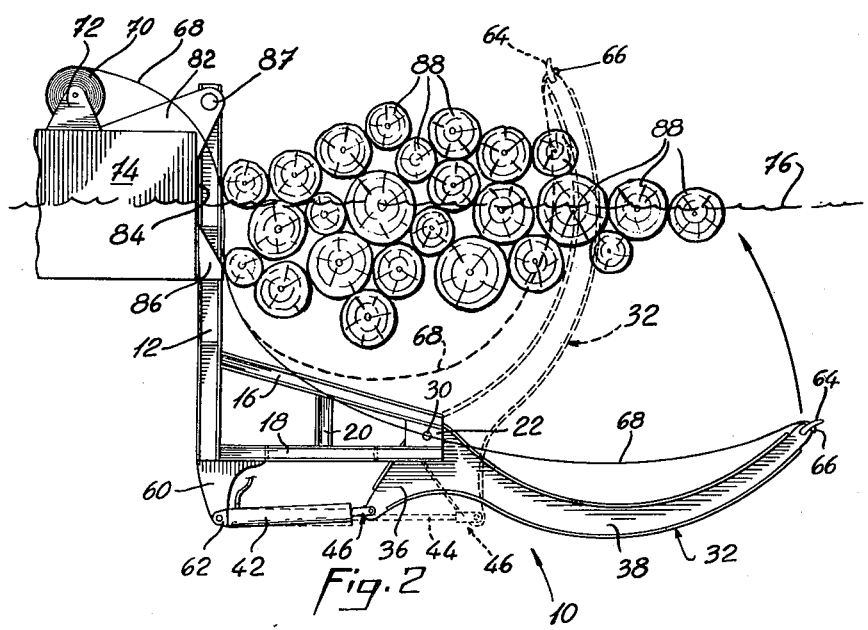
FIGS. 2 & 3 are side elevational views of the apparatus according to the subject invention illustrating the manner in which the apparatus is utilized for bundling logs.
Figure 3:
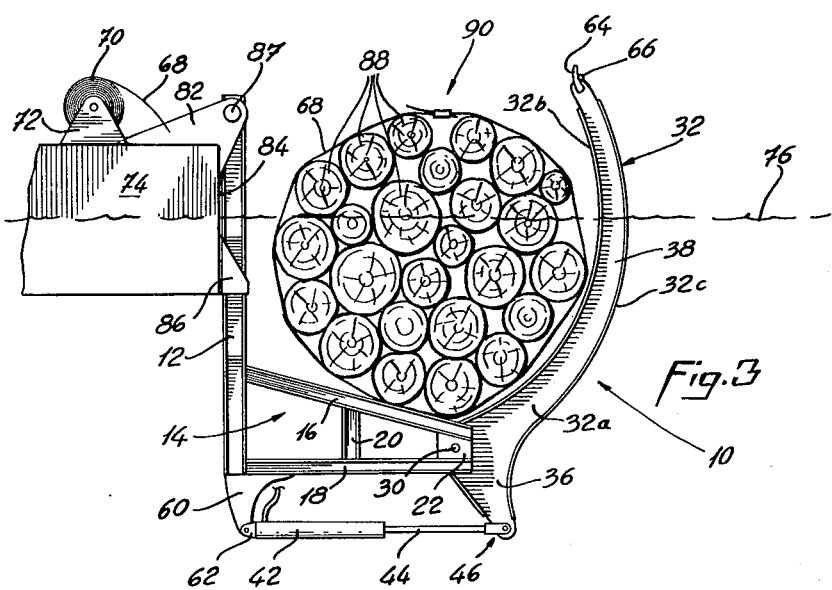

The embodiment of the log bundling apparatus according to the present application which is illustrated in the drawings is designated generally by reference numeral 10. As best seen in FIGS. 2 and 3, the apparatus 10 comprises two substantially L-shaped structures, each having a vertical leg portion 12 and a base portion 14 which extends outwardly from the lower end of the leg portion 12. The two L-shaped structures are of welded metal construction, the component parts of which are suitably sized in order to be able to support the loads to which the structures are subjected. In particular, each base portion 14 comprises an upper base member 16 and a lower base member 18, each welded at one of their ends to leg portion 12. The upper base member 16 is secured to leg portion 12 at a location spaced above the lower end of the leg portion and slopes downwardly away from the leg portion, while lower base member 18 is secured to the lowermost end of leg portion 12 and extends outwardly therefrom at right angles to the leg portion 12.

Figure 4:
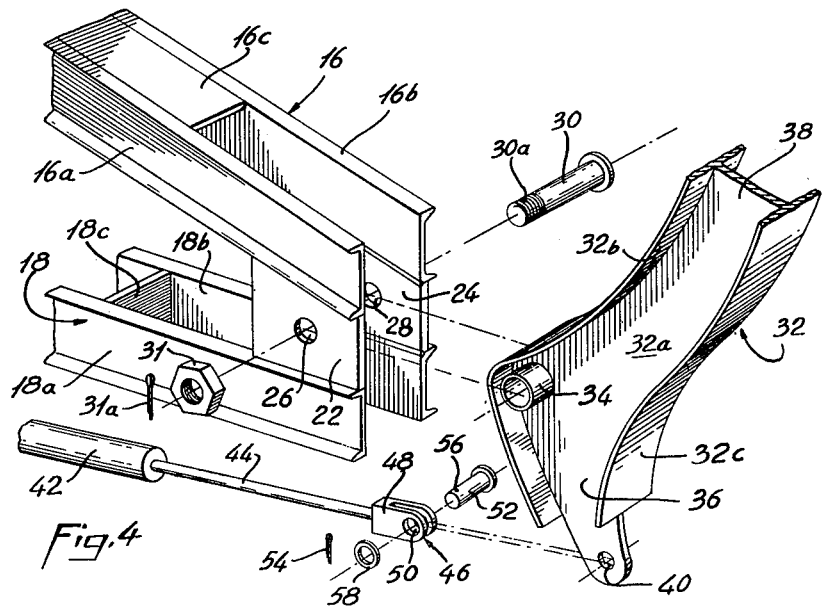
FIG. 4 is an exploded perspective view of the connection between the arm structure and the base portion of the apparatus according to the subject invention.

As best illustrated in FIG. 4, the upper base member 16 and the lower base member 18 of the embodiment of the invention are constructed from suitable sizes and lengths of channel iron. Thus, upper base member 16 includes spaced-apart parallel channel members 16a and 16b which are each welded in back-to-back relationship to an intermediate plate 16c, the latter being spaced away from the ends of the channel members in order to leave a free space between members 16a and 16b adjacent the outer ends thereof. Likewise, the lower base member 18 comprises parallel channel members 18a and 18b which are maintained in spaced-apart, back-to-back relationship, each being welded to an intermediate vertical plate 18c. Plate 18c is situated away from the outer ends of members 18a and 18b in order to provide a free space between members 18a and 18b adjacent the ends thereof. Further, the widths of the plates 16c and 18c are equal in order that the spacing between the channel members forming the upper and lower base members is equal, and channel members 16a and 16b are respectively situated directly above channel members 18a and 18b. The outer ends of channel members 16a and 18a are interconnected by a vertical plate 22 while the outer ends of channel members 16b and 18b are welded to a vertical plate 24.

Plates 22 and 24 include respective aligned openings 26 and 28, the openings providing a passage for a pivot pin 30 therethrough. When in position in openings 26 and 28, pivot pin 30 pivotally supports an arm structure which is illustrated in the present embodiment as comprising the pair of identical pivotally mounted bell crank members 32, each bell crank member 32 being supported by a respective L-shaped structure within the free space between the outer ends of the channel members forming the base portion 14. Each bell crank member 32 includes a rigidly connected collar 34 for passage of pivot pin 30 after the bell crank member 32 is positioned between the channel members with collar 34 aligned with opening 24 and 26. Pin 30 is then inserted through the aligned openings and the collar, and a lock nut 31 is placed on the threaded end of pin 30, the lock nut 31 being held in position by means of a split pin 31a which is inserted through a cooperating opening 30a adjacent the end of pivot pin 30 and then bent into a retaining position.

Each bell crank member 32 includes a lower arm 36 and an upper arm 38, the lower arm being provided with an opening 40 adjacent the end thereof in order to permit attachment of an actuating means to the bell crank member 32. The upper arm of each bell crank member 32 has a curved profile, as best seen in FIGS. 2 and 3, with the concave inner edge being so shaped as to assist in the formation of a bundle of logs. In addition, the curvature of the upper arms is such that the free ends thereof break the surface of the water at substantially a vertical angle, the reasons for which will be described below. From FIG. 4, it can be seen that the bell crank member 32 is constructed from a central plate 32a to which is secured peripheral plates 32b and 32c which extend along substantially the entire lengths of the inner and outer edges respectively of the plate 32a and are rigidly secured to the latter by welding. The I-shaped cross-section thus obtained adds to the strength of the bell crank members 32.

The actuating means connected to the lower arm 36 comprises a conventional hydraulically actuated cylinder 42 having a piston rod 44 which is connected to the opening 40 in the lower arm 36 of the bell crank member 32 by a clevis-type connection 46. The connection 46 includes a fork-like bracket 48 rigidly secured to the end of the piston rod 44, bracket 48 having a longitudinal slot which received a portion of the lower arm 36 therebetween. The fork-like bracket 48 also includes transverse aligned openings 50 therein, the openings 50 being aligned with opening 40 in the lower arm 36 of the bell crank member 32 and being secured thereto by means of a pin 52. After being inserted through openings 40 and 50, pin 52 is retained in position by means of a cotter pin 54 which is inserted through a cooperating hole 56 in the pin 52. A washer 58 is mounted on the pin 52 between the cotter pin 54 and the adjacent face of the fork-like bracket 48 prior to inserting pin 54 in hole 56. The cylinder 42 is secured at its opposite end to a plate 60 which extends downwardly from a lower surface of the lower base member 14, the plate 60 being connected to the latter by a welded connection. The cylinder 42 is secured to the plate 60 by means of a second clevis-type connection 62 in order to permit pivotal movement of the end of the cylinder about the plate 60.

The end of the upper arm 38 of each bell crank member 32 includes a strap engaging means 64 which is adapted to engage a loop 66 at the end of a flat metal strap 68. As seen in FIG. 2, the metal strap 68 extends from the strap engaging means 64 to a spool of metal strapping 70 which is rotatably supported by brackets 72, the latter being mounted on a floating support structure 74.

Figure 1:
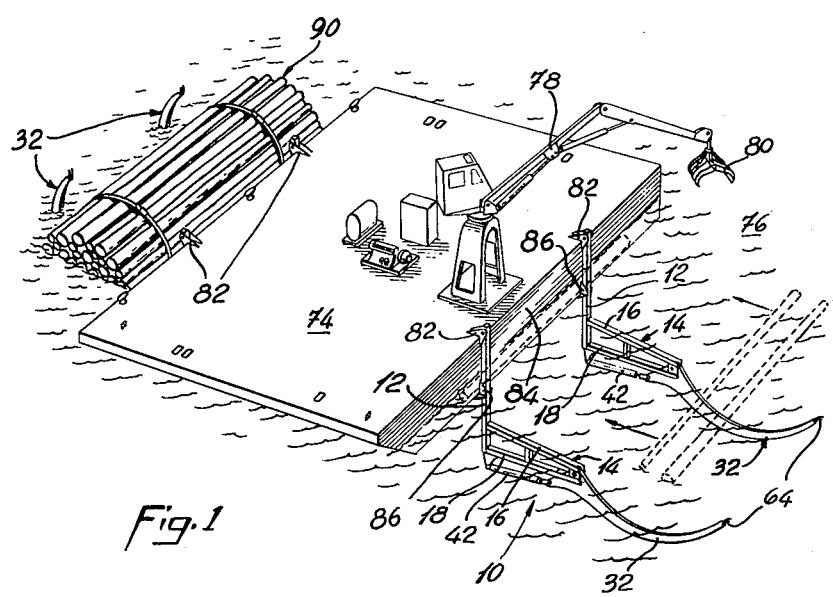
FIG. 1 is a perspective view of the log bundling apparatus mounted on a floating support structure which is located within a body of water.

As shown in FIG. 1, the support structure 74 comprises a floating platform situated in a body of water 76, the support structure having a hoist 78 with a grapple 80 which can be utilized for moving floating and submerged logs into position above the submerged portion of log handling apparatus. The use of such a hoist 78 is not essential to the operation of the log bundling apparatus, nor to the method of bundling logs according to the subject invention. Floating support structure 74 supports the log bundling apparatus in position, with upper ends of the vertical leg portions 12 being pivotally secured to the floating support structure 74 by means of support brackets 82 which are secured to the side of the floating support structure. As best seen in FIGS. 2 and 3, brackets 82 project outwardly in a cantilever-like manner beyond a vertical side wall 84 of the support structure 74. Pins 87 extend through the support brackets 82 and engage the upper ends of the vertical leg portions 12 such that the leg portions 12 are held in a substantially vertical position adjacent side wall 84 of support structure 74. Pivotal mounting of the vertical leg portions 12 permits the log bundling apparatus to be pivoted out of the water, thereby facilitating any repairs necessary to the apparatus. Spaced apart plates 86 are secured to side wall 84 and adjacent the lower edge thereof, the plates 86 adapted to receive the vertical leg portions 12 therebetween and thereby provide lateral support for the leg portions of the log bundling apparatus 10.

In use, the log bundling apparatus 10 is first mounted on the floating support structure 74 with the upper ends of the vertical leg portions 12 being pivotally connected to the support brackets 82 adjacent the side wall 84 of the support structure. While the embodiment of the invention shown in FIG. 1 is mounted on a floating platform, the log bundling apparatus can likewise be supported from a barge or possibly a wharf. Once the leg portions 12 are pivotally secured to the support structure 74, the apparatus 10 is lowered into the water such that the base portion 14 of the apparatus is completely submerged to an extemt similar to that illustrated in FIGS. 2 and 3.

To operate the log bundling apparatus, the actuating means are initially operated in order to swing the upper arms 38 of the bell crank members 32 into a position above the surface of the water. In this position, the ends 66 of the metal strapping 68 are connected to the strap engaging means 64. The actuating means is then actuated so as to lower the upper arms 38 into a submerged position, as best illustrated in FIG. 2. In this position, the metal strapping 68 extends underwater beneath the floating and submerged logs 88 which are located in the body of water 76.

The logs 88 can be advanced into a position above the submerged portion of the log bundling apparatus with the aid of a pusher boat or by utilizing hoist 78. Once a sufficient number of logs are in position above the submerged portion of the apparatus, the hydraulically operated cylinder 42 is actuated so as to urge piston rod 44 outwardly, thereby swinging the upper arms 38 of the bell crank members 32 into a position wherein the upper ends of the arms extend above the surface of the body of water 76, as illustrated in phantom in FIG. 2. As the upper arms pivot out of the water, the peripheral plate 32b of the upper arm forces logs situated avove the submerged portion of the log bundling apparatus towards the vertical leg portions 12. When the bell crank members 32 reach their fully closed position, the ends 66 of the metal strapping 68 are removed from the strap engaging means 64 and are tightly looped about the logs encircled by the log bundling apparatus, as best illustrated in FIG. 3, thereby forming a bundle of logs 90 which are tightly secured together. After the bundling operation is completed, the bell crank members 32 are operated by the actuator means so as to return the upper arms 38 to their initial submerged positions, thereby permitting removal of the bundle of logs 90 from the apparatus 10.

As noted previously, the upper base member 16 is sloped downwardly away from leg portions 12 so as to facilitate the forming of the bundle of logs as the bell crank members 32 are moved into their closed positions. In addition, after the bundle of logs has been tightly bound together, as illustrated in FIG. 3, the sloped surface of the upper base members 16 assists in maneouvering the bundle of logs 90 away from the apparatus. Also, as noted above, the upper arms 38 of the bell crank members are so shaped as to break the surface of the water at a substantially vertical angle. This feature of the invention prevents logs from rolling over the upper edge of the arms as the arms are closing.

While the embodiment of the invention illustrated in the drawings utilized two separate but identical L-shaped structures mounted from support structure 74, it is also within the scope of the present invention to utilize a single L-shaped structure by providing interconnecting structural members between two end vertical leg portions and two end base portions so as to form a unitary structure.

I claim:
1. A log bundling apparatus comprising:
    at least one L-shaped frame, each L-shaped frame including a leg portion and a base portion extending outwardly from and rigidly connected to the leg portion, each leg portion adapted to be secured to a support structure situated within a body of water, whereby each base portion and a lower section of each leg portion is adapted to be submerged beneath a surface of a body of water;
    an arm structure pivotally secured to each base portion adjacent a free end thereof;
    actuating means mounted between each L-shaped frame and each arm structure, the actuating means adapted to pivot its respective arm structure from an open position in which each arm structure is submerged beneath the surface of the water and a closed position wherein a free end of each arm structure extends above the surface of the water, whereby each arm structure is adapted to engage logs situated above each arm structure and its respective submerged base portion so as to urge the logs towards its respective leg portion as each arm structure is being advanced into the closed position by the actuating means, thereby forming a compact bundle of logs which can be secured together.

2. A bundling apparatus according to claim 1, wherein each leg portion is adapted to be pivotally mounted adjacent its upper end to a support structure situated within a body of water, the pivotal mounting adapted to permit the apparatus to be pivoted upwardly out of the water in order to facilitate repairs to the apparatus.

3. A log bundling apparatus according to claim 1, wherein an upper surface of each base portion is sloped downwardly in a direction away from the respective leg portion, the sloped upper surface adapted to assist in formation of a compact bundle of logs as the arm structure is being advanced into its closed position.

4. A log bundling apparatus according to claim 1, wherein the arm structure includes at least two bell crank members, each bell crank member pivotally secured to a respective base portion, an upper arm of each bell crank member being curved, whereby a free end of each bell crank member is adapted to break a surface of the water at a substantially vertical angle to the surface as the arm structure is advanced into its closed position, thereby assisting in the formation of a compact bundle of logs.

5. A log bundling apparatus according to claim 4, wherein each bell crank member includes a lower arm engaged by the actuating means, whereby pivoting of the lower arms by the actuating means advances the upper arms of the bell crank members between the closed and open positions thereof.

6. A log bundling apparatus according to claim 5, wherein the actuating means comprises a hydraulically actuated cylinder associated with each bell crank member.

7. A log bundling apparatus according to claim 4, wherein a free end of each upper arm includes a strap engaging means to which an end of a strap is secured prior to advancing the arm structure into its closed position, whereby at least one strap extends beneath the surface of the water and passes beneath the logs situated above each submerged arm structure and each base portion, the at least one strap being lifted around a compact bundle of logs as each arm structure is advanced to the closed position thereby facilitating the securing together of the bundle of logs by means of the at least one strap.

8. A method of bundling logs comprising the steps of operating an actuating means to lower a pivotable arm structure of a log bundling apparatus into a submerged position;
    guiding a plurality of logs into position above a submerged base portion and submerged pivotable arm structure of the log bundling apparatus;
    actuating the pivotable arm structure from its open submerged position to a closed position wherein a free end thereof extends above the surface of the water and forms the logs above the submerged base portion and arm structure into a compact bundle of logs;
    securing strapping about the bundle of logs in order to retain the logs together in the bundle; and
    actuating the pivotable arm structure from the closed position to its open submerged position and floating the bundled logs away from the log bundling apparatus.

9. A method according to claim 8, including the steps of attaching an end of the strapping to strap engaging means situated at a free end of the pivotable arm structure before the arm structure is lowered into its submerged position, and removing the end of the strapping from the strap engaging means after the arm structure is in its closed position in order to secure the strapping about the bundle of logs.

10. In combination with a floating support structure situated within a body of water, a log bundling apparatus mounted on one side of the floating support structure with two spaced-apart pairs of support brackets mounted in a cantilever-like manner along the one side of the floating support structure, each pair of support brackets pivotally supporting a respective L-shaped frame against the one side of the floating support structure, each L-shaped frame including a leg portion and a base portion which extends outwardly from and is rigidly connected to the leg portion, a lower section of each leg portion and each base portion being submerged beneath a surface of the body of water; an arm structure is pivotally secured to each base portion adjacent a free end thereof; actuating means is mounted between a section of each L-shaped frame and each arm structure, the actuating means adapted to pivot its respective arm structure from an open position in which each arm structure is submerged beneath the surface of the water and a closed position wherein a free end of each arm structure extends above the surface of the water, whereby each arm structure is adapted to engage logs situated above each arm structure and its respective submerged base portion so as to urge the logs towards its respective leg portion as each arm structure is being advanced into the closed position by the actuating means, thereby forming a compact bundle of logs which can be secured together.

11. A combination according to claim 10, wherein a hoist with a grapple is mounted on the floating support structure, the hoist and grapple being operative to manoeuvre logs into aligned positions above the submerged base portion and submerged pivotable arm structure of the log bundling apparatus.

12. A combination according to claim 10, wherein two outwardly directed pairs of spaced-apart flanges are seamed to the one side of the floating support structure, each pair of flanges engaging a respective leg portion therebetween part way along a length of the respective leg portion, each pair of flanges providing lateral support to the leg portions of the log bundling apparatus when in operation.

* * * * *